United States Patent [19]

Leiber et al.

[11] Patent Number: 5,150,951
[45] Date of Patent: Sep. 29, 1992

[54] HYDRAULIC DUAL-CIRCUIT BRAKE SYSTEM

[75] Inventors: Heinz Leiber, Oberriexingen; Manfred Steiner, Winnenden; Walter Klinkner, Stuttgart, all of Fed. Rep. of Germany

[73] Assignee: Mercedes-Benz AG, Fed. Rep. of Germany

[21] Appl. No.: 628,171

[22] Filed: Dec. 17, 1990

[30] Foreign Application Priority Data

Dec. 15, 1989 [DE] Fed. Rep. of Germany ....... 3941408

[51] Int. Cl.⁵ .................. B60T 8/34; B60T 8/48; B60T 13/12; B60K 28/16
[52] U.S. Cl. .................. 303/100; 188/181 A; 188/181 C; 188/358; 188/349; 303/9.62; 303/92; 303/113 SS; 303/113 AP; 303/115 PP; 303/116 R; 303/119 R; 303/117; 303/DIG. 3; 303/DIG. 4
[58] Field of Search ............... 303/100, 114, 116, 119, 303/92, 97, 117, 102, 103, 105, 106, 108, 109, 110, 111, 113, 115, 22.1, DIG. 3, DIG. 4, 113 R, 115 PP, 113 TR, 113 SS, 113 TB, 114 R, 114 PB, 114 PN, 116 R, 116 SP, 111 WP, 116 PC, 119 R, 113 AP; 188/358, 359, 181 A, 181 R, 349, 181 C; 60/545; 180/197

[56] References Cited

U.S. PATENT DOCUMENTS

| | | | |
|---|---|---|---|
| 4,395,072 | 7/1983 | Belart | 303/114 |
| 4,802,712 | 2/1989 | Resch | 303/114 |
| 4,811,994 | 3/1989 | Friedow | 303/113 TR |
| 4,815,792 | 3/1989 | Tröster | 303/113 R |
| 4,824,186 | 4/1989 | Leiber et al. | 303/100 X |
| 4,836,617 | 6/1989 | Resch | 303/113 TR |
| 4,846,532 | 7/1989 | Friedow et al. | 303/113 TR |
| 4,846,534 | 7/1989 | Leiber et al. | 303/113 SS |
| 4,861,118 | 8/1989 | Burckhardt et al. | 303/100 X |
| 4,877,296 | 10/1989 | Leiber et al. | 303/113 SS |
| 4,890,891 | 1/1990 | Leiber | 303/92 X |
| 4,893,882 | 1/1990 | Leiber et al. | 303/117 X |
| 4,904,028 | 2/1990 | Leiber et al. | 303/100 X |
| 4,904,029 | 2/1990 | Leiber et al. | 303/92 X |
| 4,919,493 | 4/1990 | Leiber | 303/113 SS |
| 4,948,200 | 8/1990 | Leiber et al. | 303/100 X |
| 5,013,094 | 5/1991 | Nishii et al. | 188/58 X |
| 5,015,043 | 5/1991 | Resch | 303/10 |

FOREIGN PATENT DOCUMENTS 3440541 5/1986 Fed. Rep. of Germany.
3723916 1/1989 Fed. Rep. of Germany.
3841738 6/1990 Fed. Rep. of Germany.

*Primary Examiner*—Douglas C. Butler
*Attorney, Agent, or Firm*—Evenson, Wands, Edwards, Lenahan & McKeown

[57] ABSTRACT

A hydraulic dual-circuit brake system for a road vehicle with front-axle/rear-axle brake circuit division has a tandem main cylinder as a brake device. The primary output pressure space of the cylinders is associated with the front-axle brake circuit, and the secondary output pressure space of the cylinders is associated with the rear-axle brake circuit. A pressure modulator adjusts the front-axle/rear-axle braking force distribution in the direction of an approach to the, in each case, ideal braking force distribution, as a braking-pressure actuator for the rear-axle brake circuit. The pressure modulator has a drive pressure space, by the charging of which with the output pressure of an auxiliary pressure source under solenoid valve control, a braking pressure which can be coupled into the rear-wheel brakes can be built up in an output pressure space of the pressure modulator. This output pressure space is also connected to the output pressure space of the brake device provided for the rear-axle brake circuit. During normal braking action, the output pressure space of the pressure modulator is blocked off against the output pressure space of the brake device, and the pressure build-up in the rear-axle brake circuit is exclusively effected by the pressure modulator which is driven in the direction of a servo control for which a set point $P_S$ correlated with the braking pressure in the front-axle circuit as ideal or almost ideal value is utilized as a reference variable.

35 Claims, 6 Drawing Sheets

HYDRAULIC DUAL-CIRCUIT BRAKE SYSTEM

BACKGROUND SUMMARY OF THE INVENTION

The present invention relates to a hydraulic dual-circuit brake system for a road vehicle, preferably a with front-axle/rear-axle brake circuit division, spaces each allocated to one of the two brake circuits, in comprising a brake device which has two output pressure which static pressures can be built up proportionally to the actuating force. An electro-hydraulic open-loop braking-pressure control device, in closed-loop control phases of a closed-loop antiblocking and/or of a closed-loop drive slip control device, conveys the open-loop control of braking-pressure changing and braking-pressure holding phases and, in normal braking operation, conveys an adjustment of the front-axle/rear-axle braking force distribution to the extent where the braking force distribution at least approximates the ideal braking force distribution both in the part- and full-braking range.

A hydraulic dual-circuit brake system is shown in DE 37 23 916 A1 and comprises a main cylinder associated with the front-axle brake circuit and main cylinder associated with the rear-axle brake circuit which are arranged in twin-type construction in a common housing and can be actuated via a torque-compensated rocker which is engaged by the actuating force amplified by a hydraulic braking force amplifier. For each of the main cylinder pistons, a position transmitter is provided which emits electric output signals characteristic of the respective piston position. The signals are evaluated as a measure of the braking pressures generated in the two main cylinders by an electronic control unit. To be able to raise the braking pressure in the rear-axle brake circuit in the direction of an approach to an ideal braking force distribution, a drive cylinder which can be charged with the output pressure of an auxiliary pressure source under solenoid valve control is provided in the known brake system. The drive cylinder acts on the actuating arm of the rocker of the brake device associated with the rear-axle main cylinder.

A very good approach to an ideal braking force distribution and, to this extent, an improved braking effect, can be achieved, particularly in the part-braking range, with the known brake system so that a general use of such a brake system is desirable. The disadvantageous factor in the known brake system is, however, the technically very elaborate construction of the brake device and of the hydraulic braking force amplifier required for it including the additional drive cylinder so that the known brake system, in practice, cannot be considered for use in series vehicles for cost reasons and, if at all, can only be used for special vehicles.

A brake system in which a relatively good approximation of the front-axle/rear axle braking-force distribution can be achieved, at least in the part-braking range, is also shown in DE 34 40 541 A1. In this known brake system, an electronically controlled braking-force distributor is provided which has as control element a 2/2-way solenoid valve by way of which the main brake line, which branches towards the rear-wheel brakes, of the rear-axle brake circuit can be released and blocked off under pulse control. The $P_{VA}/P_{HA}$ ratio between the braking pressure $P_{VA}$ in the front-axle brake circuit and the braking pressure $P_{HA}$ in the rear-axle brake circuit can be varied within wide limits by adjusting the pulse/interval ratio and to this extent can also be approximated to the optimum braking force distribution which is in each case determinative. The output signals required for the braking force distribution control are generated by an electronic control unit which is supplied as input signals with the output signals from wheel speed sensors individually associated with the vehicle wheels, the level and/or frequency of the output signals of which are a measure of the dynamic condition of the respective vehicle wheels. By this type of drive, it is also possible to achieve a close-loop antiblocking control system operating in accordance with the principle of a single-channel closed loop control at the rear axle. So that braking is still possible with a failure of the safety-related control valve, a by-pass pressure medium path parallel to the control valve is provided which, in turn, contains elements for braking-force distribution control in the sense of achieving a braking force distribution designed for a stable dynamic behavior of the vehicle. The required valves also limit the closed-loop control range within which a variation of the braking force distribution is possible, if at all, by means of a pulsed driving of the braking-force distribution control valve. The known brake system can therefore be used for utilizing optimum braking force distributions in the part-braking range. To this is added that the known brake system, regardless of the relatively simple possibility of braking-force distribution control in the part-braking range, is relatively expensive since actuating elements for an effective limitation of the rear-axle braking pressure must be provided in the by-pass pressure medium path, which elements are only intended for the rare case of a malfunction of the distribution control valve.

Furthermore, a brake system for a motor vehicle with an antiblocking system operating with independent braking-pressure control at the front wheel brakes and dependent control at the rear-wheel brakes and dependent control at the rear-wheel brakes is described in the previously published in DE 38 41 738 A1. The two front-wheel brakes belong to different brake circuits. According to the described embodiment of the brake system, the rear-wheel brakes are combined to form one rear-axle brake circuit for which the braking pressure generated by a pressure modulator. The modulator output pressure corresponds to a mean value of the - possibly controlled - braking pressures in the two front-wheel brakes.

According to a further embodiment described in DE 38 41 738 A1, each of the rear wheel brakes is associated with its own pressure modulator. The modulator output pressure in that embodiment corresponds to a mean value of the front-axle braking pressures which is weighted to such an extent that the braking pressure in the rear-wheel brake of one vehicle side is influenced to a greater extent by the braking pressure in the front-wheel braking pressure of the other vehicle side. The purpose of this type of braking-force distribution, control is still to achieve the highest possible values of vehicle deceleration during a braking action subjected to a closed-loop antiblocking control with extreme $\mu$-split conditions. That is to say if, for example, the vehicle wheels of the left-hand vehicle side roll along a roadway area having a relatively high coefficient of friction locking and the vehicle wheels of the right-hand vehicle side roll along a roadway area having a low coefficient of friction locking there is an extreme μ-split condition. Measures for using the braking-pressure actuators of the brake system shown in DE 34 40 541 A1 or of the type described in DE 38 41 783 A1 in a closed-loop antiblocking control, a closed-loop drive slip control and, in addition, an open-loop control of braking-force distribution in the direction of an approach to its ideal value suitable in the entire braking range are not found in DE 34 40 541 A1 nor in DE 38 41 738 A1.

It is, therefore, an object of the present invention, starting with a brake system of the general type described above which has good functional characteristics insofar as the most optimum braking-force distribution including the possibility for closed-loop antiblocking control and for closed-loop drive slip control, to improve such a system with much simpler implementation.

This object has been achieved in accordance with the present invention by constructing the braking-pressure actuator as a pressure modulator which has an output pressure space movably delimited in a pressure-tight manner with respect to a drive pressure space by a piston and which, on the one hand, is connected to the associated brake circuit (II) and, on the other hand, can be connected to the output pressure space associated with the latter of the brake device. The output pressure space is blocked off against the associated output pressure space of the brake device in normal braking operation, and the pressure build-up in the brake circuit (II) connected to the output pressure space of the pressure modulator is effected by valve-control pressure charging of the drive pressure space with the output pressure of an auxiliary pressure source. The pressure build-up in this brake circuit (II) is implemented by a servo control, for which a set point $P_S$ for the braking pressure in the brake circuit (II) connected to the pressure modulator, correlated with the braking pressure in the other brake circuit (I) is ideal or approximately ideal value, is utilized as its reference variable.

In particular, a pressure modulator is provided for the brake circuit in which the braking pressure is to be corrected in the direction of an approach to the ideal braking force distribution in correlation with the pressure prevailing in the other brake circuit. The pressure modulator is blocked off against the output pressure space of the brake device associated with the brake circuit from the beginning of a braking action and then communicates the braking pressure build up in the servo-controlled brake circuit by valve-controlled pressure application of the output pressure of an auxiliary pressure source to a drive pressure space.

An essential advantage of the type of braking force distribution control provided in accordance with the present invention arises from this control being implemented in combination with any brake devices operating with static output pressures, that is to say in combination with the predominant majority of the brake devices normally used for dual-circuit brake systems of series of vehicles. Although the pressure modulator also involves a certain technical complexity regardless of its simple construction, this is overcome, at least in a presently preferred embodiment of the brake system in which a tandem main cylinder is provided as a braking-pressure generator, the primary output pressure space of which is associated with the front-axle brake circuit (I) and the secondary output pressure space of which is associated with the rear-axle brake circuit (II). The rear-axle brake circuit (II) is connected to the outlet pressure space of the pressure modulator. Thus, the pressure modulator can also be utilized as braking-pressure actuator for a closed-loop antiblocking control at the rear-axle brake circuit of the vehicle and acts in the same direction on both rear-wheel brakes.

In combination with this, it is particularly advantageous for the antiblocking system of the vehicle to operate at the front-axle brake circuit in accordance with the principle of changing the braking pressure by a pressure modulator which can be charged from the same auxiliary pressure source as the pressure modulator provided for the servo control of the braking pressure at the rear-axle brake circuit so that to this extent, also a simple overall construction can be achieved.

It should be noted that the principle of open-loop braking force distribution control according to the invention can also be utilized in vehicles having a diagonal brake circuit division but that in these a separate braking-pressure modulator must then be provided for each rear-wheel brake.

"Pressure" sensors integrated into the piston of a pressure modulator to generate the output signal characteristic of the braking pressure in at least one of the two brake circuits can be implemented as piezo-electric elements or pressure-sensitive resistance elements.

As an alternative to this, position transmitters can also be utilized as sensors which generate electrical output signals characteristic of the braking pressures in the front-axle and in the rear-axle brake circuit. The position transmitter can monitor the position of the primary piston or of the brake pedal of the brake device and can be a sensor which generates the brake circuit. Alternatively, the position transmitter detects the position of the piston of the pressure modulator associated with the rear-axle brake circuit and generates the output signal characteristic of the braking pressure in the rear-axle brake circuit.

The formation of the reference $P_S$ for the rear-axle braking pressure, as a function of vehicle-specific data of axle load distribution, rear axle load, wheelbase-related height of center of gravity and of the loading situation and other data characteristic of the operating situation has the advantage that optimum approach of the braking force distribution implemented in each case to the ideal braking force distribution is achieved in the most varied operating situations of the vehicle. In this connection, the dynamic parameters, $\lambda v$ and $\lambda h$, the vehicle speed $V_F$, the longitudinal vehicle deceleration $a_X$ and, in principle also a transverse acceleration $a_Y$ acting on the vehicle can be obtained from a processing, which is carried out in accordance with known criteria, for the output signals of wheel speed sensors which are provided for the closed-loop antiblocking control device for monitoring the dynamic behavior of the vehicle wheels.

For an accurate detection of the transverse vehicle acceleration $a_Y$ it is more advantageous, however, if a separate sensor of a type of construction known per se is provided.

A test circuit provided at least to detect a failure of the front-axle brake circuit ensures that when the front-axle brake circuit fails, braking pressure can be built up in the rear-axle brake circuit, which otherwise tracks the braking pressure of the latter, via the brake device of the brake system.

Another feature of the present invention provides a simple implementation of the test circuit detecting the front-axle brake circuit failure for the case where the sensor which generates the output signal characteristic of the braking pressure in the rear-axle brake circuit is constructed as force transmitter. A failure of the sensor associated with front-axle brake circuit, by way of which a failure of the front-axle brake circuit could only be simulated, can be detected by the fact that when a signal characteristic of a vehicle deceleration is present, this sensor does not generate an output signal, and a failure of the force sensor associated with the rear-axle brake circuit is directly detected by the fact that the latter does not supply an output signal.

For the case where the sensor which generates the output signal characteristic of the braking pressure in the front-axle brake circuit is a position transmitter which monitors, for example, the position of the pressure rod piston of the brake device, the present invention allows a simple design of a test circuit detecting a front-axle brake circuit failure.

Here, too, a failure of the sensor itself can be detected by the fact that when a vehicle deceleration signal is present, the sensor does not generate an output signal.

In combination with a special configuration of the pressure modulator provided for the servo control of the rear-axle braking pressure, the present invention provides a test circuit by means of which the degree of venting of the rear-axle brake circuit can be detected with good accuracy and can thus also be taken into consideration in the formation of the reference quantity. When the degree of venting of the rear-axle brake circuit is known, the state of venting of the front-axle brake circuit can also be determined from the vehicle deceleration measured during a braking action and the associated position of the pressure rod piston of the brake device and can also be taken into consideration in the formation of the reference quantity $P_S$ for the pressure proportioning in the rear-axle brake circuit.

Particularly, in the design and utilization of the pressure modulator in which a second output pressure space is connected to the front-axle brake circuit and is movably delimited by the piston of the rear-axle pressure modulator, for which a constructionally simple implementation has been provided by the present invention, a main cylinder with piston cross-sections which are smaller compared with an otherwise normal design can be selected as brake device, with the advantageous consequence that during a failure of the front-axle brake circuit a translation discontinuity becomes effective which enables relatively higher braking pressures to be utilized in the rear-axle brake circuit. The same also applies to the embodiment of the brake system according to the invention already previously explained. Due to the valve blocking off the output pressure space of the pressure modulator off against the associated output pressure space of the brake device in normal braking operation, as a mechanically operated valve which is integrated into the pressure modulator in the presently preferred embodiment, an electrically drivable shut-off valve which would otherwise be required can be dispensed with.

If the braking-pressure control valve, via which the output pressure of the auxiliary pressure source can be coupled into the drive pressure space of the pressure modulator, is driven in a pulsed mode, a closed-loop braking-pressure control valve connected between the output pressure space of the pressure modulator and the rear-wheel brakes can also be eliminated.

Due to further features of the present invention, a particularly advantageous configuration of the auxiliary pressure source provided for supplying the pressure modulators and the braking force amplifier with driving pressure, by way of which it is ensured that the braking force amplifier is preferentially supplied with auxiliary energy if it is necessary to brake in a state of the reservoir of the auxiliary pressure source which requires charging, is specified for the case where the brake system is equipped with a hydraulic braking force amplifier.

BRIEF DESCRIPTION OF THE DRAWINGS

These and further objects, features and advantages of the present invention will become more apparent from the following detailed description of presently preferred embodiments when taken in conjunction with the accompanying drawings wherein.

DETAILED DESCRIPTION OF THE DRAWINGS

Figure 1:
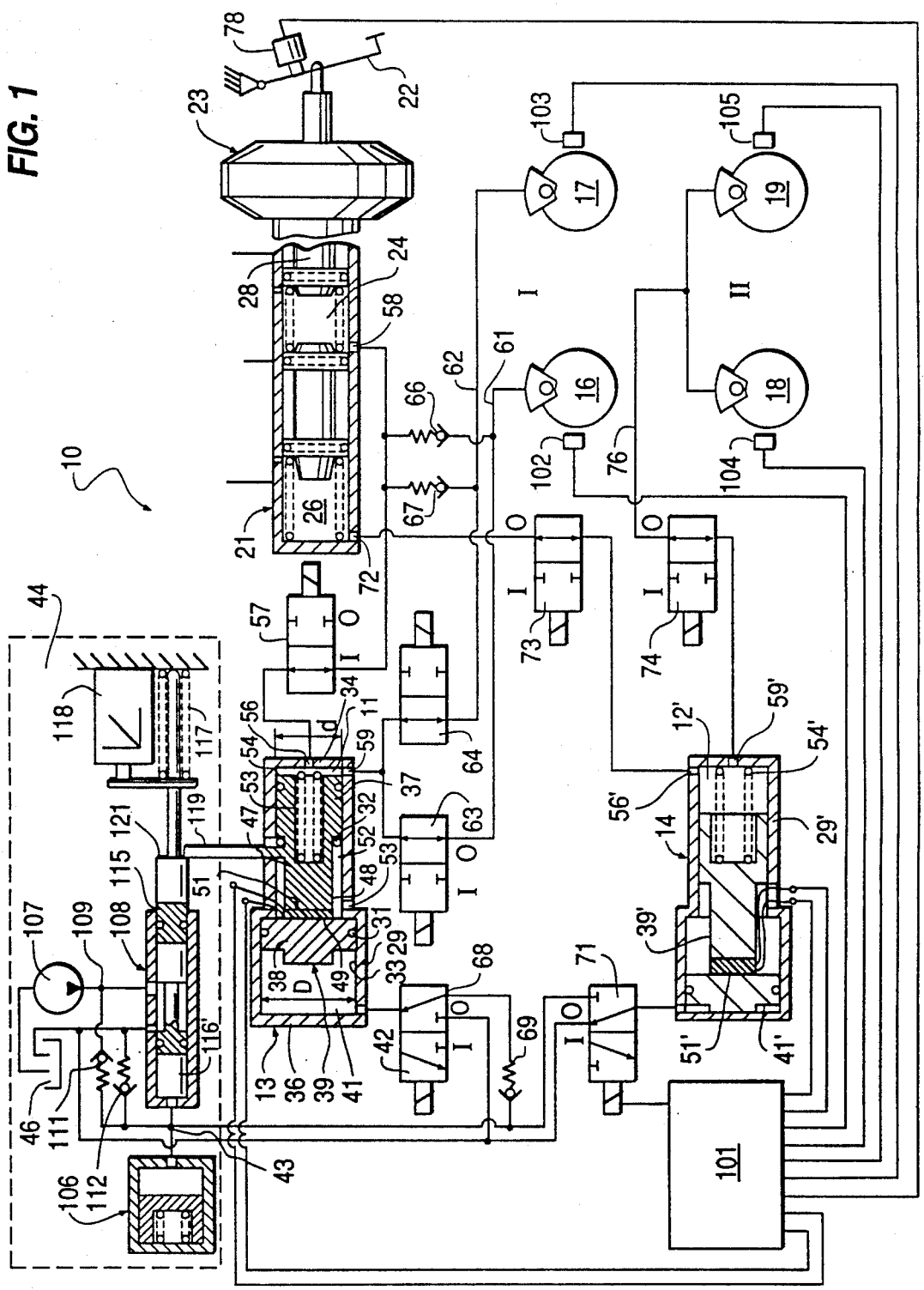
FIG. 1 is a block diagram of a first embodiment of a brake system according to the present invention, in which force sensors integrated into pressure modulators associated with these circuits are provided for the detection of the braking pressures in the front-axle and in the rear-axle brake circuit.

In the embodiment shown in FIG. 1, a hydraulic dual-circuit brake system according to the present invention is designated generally by the numeral 10 is combined with an antiblocking system (ABS) which operates in accordance with the principle of braking-pressure modulation by changing the volume of output pressure spaces 11 and 12, respectively, of pressure modulators 13 and 14, respectively individually associated with the two brake circuits I and II. The front-wheel brakes 16 and 17 are combined to form the front-axle brake circuit I and the rear-wheel brakes 18 and 19 are combined to form the rear-axle brake circuit II.

A conventional tandem main cylinder 21 is provided as a braking-pressure generator or brake device, respectively, which can be actuated by a brake pedal 22 via a hydraulic or pneumatic braking-force amplifier 23. The main cylinder 21 has a primary output pressure space 24 associated with the front-axle brake circuit I and a secondary output pressure space 26 associated with the rear-axle brake circuit II which are movably delimited with respect to one another in a pressure-tight manner by a floating piston 27 in the tandem main cylinder 21. The second axial boundary of the primary output pressure space 24 of the tandem main cylinder 21 is formed by a pressure rod piston 28 which is acted on by the amplified pedal force.

The pressure modulator 13 associated with front-axle brake circuit I is a stepped cylinder with a housing 29 of which has two bore steps 32 and 33 which are offset with respect to one another or joined to one another via a radial step 31. The steps 32, 33 are coaxial with respect to a central longitudinal axis of the modulator housing 29 and are each closed off by an end wall 34 and 36, respectively.

In the two bore steps 32 and 33, flanges 37 and 38 of corresponding diameter d and D, respectively, of a modulator piston, designated generally by the numeral 39 overall, are displaceably carried in a pressure-tight manner. The output pressure space 11 is axially movably delimited by the piston flange 37 having the smaller diameter d, and a drive pressure space 41 is axially movably delimited by the piston flange 38, having the larger diameter D. The drive pressure space 41 can be connected via an ABS function control valve 42 to the high-pressure output 43 of an auxiliary pressure source designated generally by the numeral 44, and can be charged with its output pressure and, as an alternative, can be relieved in the direction of its pressureless storage reservoir 46.

The piston flange 37 movably delimiting the output pressure space 11 has a piston rod-shaped extension 47 pointing towards the piston flange 38 movably delimiting the drive pressure space 41. The diameter of the extension 47 is slightly smaller than that of the smaller bore step 32. Between the front faces 48 and 49, facing one another, of the piston rod-shaped extension 47 and of the larger piston flange 38, which extend in parallel with one another, a force sensor 51 represented as a disc-shaped element is arranged via which the larger piston flange 38 is axially supported against the smaller piston flange 37 or its extension 47, respectively. For this force sensor 51, it is assumed that it generates an electrical output signal which is proportional to an axial compression and the level of which is a measure of the axial reaction force which acts between the piston flanges 37 and 38 of the modulator piston 39 which are axially supported against one another. By way of a cavity 52 extending between the two piston flanges 37 and 38, which cavity is provided with a drain opening 53 for leaking oil and which can be entrained into the annular space 52, on the one hand, from the drive pressure space 41, and, on the other hand, from the output pressure space 11, an effective separation of media is achieved in a simple manner between the brake circuit I and the auxiliary pressure circuit which is operated with conventional hydraulic oil.

The piston part comprising the smaller piston flange 37 and its piston rod-shaped extension 47 is provided with a central, blind hole-shaped recess 53 which is open towards the drive pressure space 11, the bottom of the space 11 is engaged by a pretensioned restoring spring 54 which is supported with its other end against the end wall 54 closing off the smaller bore step and, as a result, attempts to urge the modulator piston 39 into its position associated with a maximum volume of the output pressure space 11.

The pressure modulator 13 has a pressure input 56 which is connected via an ABS control valve 57 to the pressure output 58 of the primary output pressure space 24 of the tandem main cylinder 23. The ABS control valve 57 is constructed as 2/2-way solenoid valve whose basic position 0, which is associated with a normal braking action, (i.e., a braking action which is not subjected to any closed-loop antiblocking control), is its flow position in which the output pressure space 11 of the pressure modular 13 communicates with the primary output pressure space 24 of the brake device 21, and whose excited position I is its block position into which it is switched for the duration of an antiblocking control cycle. The output pressure space 11 of the pressure modulator 13 is connected to the two brake line branches 61 and 62, which lead to one each of the wheel brakes 16 and 17 of the front-axle brake circuit I, at a pressure output 59, provided especially for the purpose, of the pressure modulator 13.

The two brake line branches 16 and 62 can be individually or jointly blocked off against the pressure output 59 of the pressure modulator 13 by one each braking-pressure control valves 63 and 64, respectively, of the antiblocking system. These two braking-pressure control valves 63 and 64 are constructed as 2/2-way solenoid valves the basic position 0, which is associated with normal braking operation is their flow position and whose excited position I, which can be utilized for closed-loop antiblocking control operation, is their blocked position.

The two brake line branches 61 and 62 are connected via one non-return valve 66 and 67 each, respectively, which are blocked by relatively higher pressure in the primary output pressure space 24 of the brake device 21 and in the wheel brake cylinders but are charged in the opening direction by relatively higher pressure in the wheel brake cylinders than in the primary output pressure space 24 of the brake device, to the pressure output 58 of the primary output pressure space 24 of the brake device 21.

The ABS function control valve 42 is a 3/2-way solenoid valve whose basic position 0 is the functional position in which the drive pressure space 41 of the pressure modulator 13 is connected to the high-pressure output 43 of the auxiliary pressure source 44 but is blocked off against its storage reservoir 46 and whose excited position I is the functional position in which the drive pressure space 41 of the pressure modulator 13 is connected the pressureless storage reservoir 46 of the auxiliary pressure source 44 but is blocked off against its high-pressure output 43.

Between the P supply connection 68 of the ABS function control valve 42 and the high-pressure output 43 of the auxiliary pressure source 44, a safety non-return valve 69 is connected which is blocked by a relatively higher pressure in the drive pressure space 41 of the pressure modulator 13 than at the high-pressure output 43 of the auxiliary pressure source 44.

The pressure modulator 14 associated with rear-axle brake circuit (II) is essentially the same as the previously described front-axle brake circuit pressure modulator 13. Therefore the same reference symbols are used for the pressure modulator 14 but are primed. With respect to the description of similar elements designated in this manner of the pressure modulator 14 of the rear-axle brake circuit II, reference is made to the above related description of the pressure modulator 13 of the front-axle brake circuit I.

Between the drive pressure space 41' of the rear-axle pressure modulator 14 and the auxiliary pressure source 44, a solenoid valve 71 constructed as 3/2-way valve is used both as braking-pressure control valve and as ABS function control valve. The valve 71 is connected in the basic position 0 such that the drive pressure space 41' of the rear-axle pressure modulator 14 is connected to the pressureless storage reservoir 46 of the auxiliary pressure source 44 but is blocked off against its high-pressure output 43, and in the excited position I such that the drive pressure space 41 of the rear-axle pressure modulator 14 is connected to the high-pressure output 43 of the auxiliary pressure source 44 but is blocked off against its storage reservoir 46.

A pressure-supply control valve 73 constructed as 2/2-way solenoid valve is connected between the pressure input 56' and the pressure output 72 associated with the rear-axle brake circuit II, of the secondary output pressure space 26 of the tandem main cylinder 21 such that the basic position 0 is its flow position connecting the secondary output pressure space 26 of the brake device 21 to the output pressure space 12' of the rear-axle pressure modulator 14 and the excited position I of which is its blocked position.

For the rear-axle brake circuit II, it is assumed that the ABS is operating on this with in-phase closed-loop control at both rear-wheel brakes 18 and 19. Only one braking-pressure control valve 74 is accordingly connected between the pressure output 59' of the rear-axle pressure modulator 14 and the main brake line 76, branching towards the rear-wheel brakes 18 and 19, of the rear-axle brake circuit II. The braking-pressure control valve 74 of the rear-axle brake circuit II is a 2/2-way solenoid valve whose basic position 0 is utilized for normal braking operation and is its flow position connecting the main brake line 76 to the output pressure space 12' of the rear-axle pressure modulator 14, and whose excited position I is utilized for braking-pressure holding phases of the closed-loop antiblocking control and is its blocked position.

The operation of the brake system 10 shown in FIG. 1 will now be explained. Therefore, reference shall now also be made to the block diagram of FIG. 2 which shows the functionally essential components of an open-loop control stage designated generally by the numeral 77 and provided for driving the solenoid valves 71, 73 and 74 associated with the rear-axle brake circuit II. The solenoid valves 71, 73 and 74 are only represented by their control solenoids in FIG. 2.

In normal braking operation, i.e., not subject to closed-loop antiblocking control, the drive pressure space 41 of the front-axle pressure modulator 13 is connected via the ABS function control valve 42, which is in its basic position 0, to the high-pressure output 43 of the auxiliary pressure source 44. As a result, the modulator piston 39 is urged into its functional position associated with minimum volume of the output pressure space 11 of the front-axle pressure modulator 13 and is held in this position. The open-loop ABS control valve 57 of the front-axle brake circuit I and its closed-loop braking-pressure control valves 63 and 64 assume their basic positions shown, i.e., their flow positions, in which braking pressure from the primary output pressure space 24 of the tandem main cylinder 21 can be coupled in the front-wheel brakes 16 and 17.

In the rear-axle brake circuit II, the braking pressure is built up with the aid of tee rear-axle pressure modulator 14. The drive pressure space 41' is connected to the high-pressure output 43 of the auxiliary pressure source 44 by switching the open-loop braking-pressure or ABS function control valve 71 into its excited position I, while, at the same time or even before, that is to say with the operation of the brake light switch 78 of the brake system 10, the open-loop pressure-supply control valve 73 is switched into its excited position I (its blocked position). As a result, the output pressure 12' of the rear-axle pressure modulator 14 is blocked off against the secondary output pressure space 26 of the tandem main cylinder 21 which is associated with the rear-axle brake circuit II. The single closed-loop braking-pressure control valve 74 of the rear-axle brake circuit II remains in its basic position 0 (its flow position) with normal braking action, in which the braking pressure in the rear-wheel brakes 18 and 19 can be built up and removed.

Starting with the basic position of its modulator piston 39', assumed at the beginning of a braking action with the maximum volume assumed by the output pressure space 12' of the rear-axle pressure modulator 14, this piston is subjected to a displacement in the direction of a reduction of the volume of the output pressure space 12' due to the pressure charging of the drive pressure space 41'. As a result, brake fluid is displaced into the rear-wheel brakes 18 and 19 and braking pressure is built up therein. The build-up of braking pressure in the rear-axle brake circuit II is effected by a servo control for which the braking pressure coupled into the front-wheel brakes 16 and 17 is essentially used as a reference variable. The output signal of the force sensor 51 of the front-axle pressure modulator 13 is a direct measure of this braking pressure. The output signal of this force sensor 51 is characteristic of the front-axle braking pressure and is supplied as input to a processor 79 of the control stage 77 which determines, taking into consideration vehicle-specific data such as axle-load distribution and wheel-base related height of the center of gravity of the vehicle and, if necessary, taking into consideration the loading situation (straight ahead travel or curve travel), the value of the braking pressure for the rear-axle brake circuit II which, when set, results in an "ideal" front-axle/rear-axle braking force distribution. That is to say, a braking force distribution is determined which, with the constraint that the vehicle should remain dynamically stable during the braking action, corresponds to an optimum utilization of friction locking at the front wheels and the rear wheels.

Figure 3:
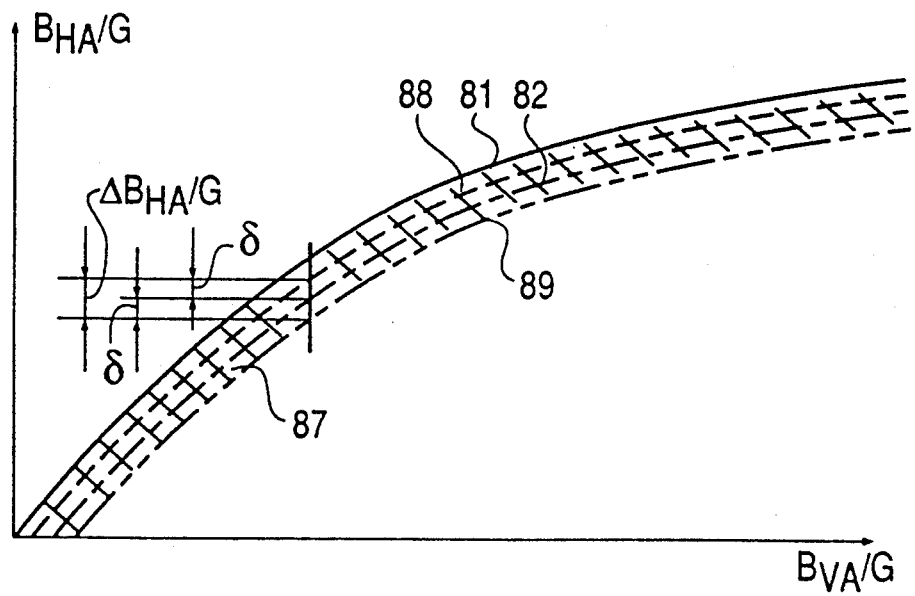
FIG. 3 is a braking force distribution diagram for explaining the operation of the brake system according to FIG. 1.

In FIG. 3, the details of which will now be referred to, shows the front-axle braking force Bva/G referred to the vehicle weight G is plotted along the abscissa and the rear-axle braking force Bha/G, also referred to the vehicle weight G, is plotted along the ordinate. The variation of a parabola 81 of the ideal braking force distribution, which corresponds to equal utilization of friction locking at the front wheels and the rear wheels of the vehicle during a braking action, is determined by the pairs of values (Bva/G, Bha/G) corresponding to a braking force distribution which is ideal with straight-ahead travel.

The dynamic behavior of the vehicle is stable during a braking action for front-axle/rear-axle pairs of braking force values (Bva/G, Bha/G) below the parabola 81 of the ideal braking force distribution while an unstable dynamic behavior of the vehicle must be expected with pairs of values above the parabola 81 of the ideal force distribution. This instability is due to the fact that in this range, the rear-wheel brakes 18, 19 tend to block earlier than the front-wheel brakes 16 and 17 if the braking Z reaches the determining coefficient of friction locking, with the result that the vehicle becomes dynamically unstable.

To avoid such an unstable braking behavior of the vehicle, the value of the rear-axle braking pressure to be paired by the processor 79 with a value of the front-axle braking pressure determined by way of the force sensor 51 is determined in such a manner that the resultant pairs of values in the diagram of FIG. 3 determine the variation of parabola 82, drawn dot-dashed, which extends at a "vertical" safety distance Bha/G below the parabola 81 of the ideal braking force distribution and to this extent marks a curve of a quasi-ideal braking force distribution.

The set point $P_S$ of the rear-axle braking-pressure formed by the processor 79 and corresponding in each case to the curve of the quasi-ideal braking force distribution is supplied as a first input to a comparator 83 which is also supplied with the output signal characteristic of the braking pressure in the rear-axle braking circuit II of the force sensor 51' of the rear-axle braking pressure modulator 14 as a second input.

From an essentially comparative processing of the two inputs, the comparator 83 generates, via its two outputs 84 and 86, control signals emitted to the open-loop braking-pressure control valve 71 and the closed-loop braking-pressure control valve 74, respectively, of the rear-axle brake circuit II. By way of these control signals, these valves 71 and 74 are switched between their basic positions 0 and their excited positions I in such a sequence that the rear-axle braking pressure follows the set point variation of the rear-axle braking pressure corresponding to the quasi-ideal braking force distribution by way of the parabola 82 within the strip-shaped tolerance band 87 drawn shaded in FIG. 3.

In this arrangement, the braking pressure can be coupled into the rear-wheel brakes 18 and 19 by pulsed driving of the closed-loop braking-pressure control valve 74 in braking-pressure build-up phases while the open-loop braking-pressure control valve 71 remains held in its position connecting the high-pressure output 43 of the auxiliary pressure source 44 to the drive pressure space 41' of the pressure modulator 14. Similarly, braking-pressure removal phases can be achieved by a pulsed driving of the open-loop braking-pressure control valve 71 while the closed-loop braking-pressure control valve 74 is held in its basic position 0. The curves 88 and 89, forming the edge of the strip-shaped tolerance band 87 in accordance with the representation of FIG. 3, denote switching thresholds for the solenoid valves 71 and 74 and are internally generated in the comparator 84 by addition of a threshold value $\delta$ to the set point curve 82 and, respectively, subtraction of such a threshold value from the latter. This threshold value $\delta$ corresponds to approximately one half of the threshold value $\Delta$Bha/G.

To detect a failure of the front-axle braking circuit I, a test circuit 91 is provided in the open-loop control stage 77. The circuit 91 triggers test cycle after a predetermined time interval of, for example, 1 s after the beginning of a braking action. The start of the time interval is triggered by the operation of the brake light switch 78. After this time interval has elapsed, the test circuit outputs at 92 a signal by virtue of which the closed-loop braking-pressure control valve 74 of the rear-axle brake circuit II is for a short time switched into its blocked position I and, at the same time, the open-loop pressure supply control valve 73, which had been driven into its blocking position I with the beginning of the braking action, is switched back into its basic position 0 (its flow position) in which the output pressure space 26, of the brake device 21 associated with the rear-axle brake circuit II, is connected to the output pressure space 12' of the rear-axle pressure modulator 14. If the front-axle brake circuit I has failed in this situation, with the result that the pressure rod piston 28 is supported against the secondary piston 27 of the brake device, a pressure rise occurs in the output pressure space 12' of the rear-axle pressure modulator 14 which is detected by the test circuit 91 from the output signal associated with this pressure rise of the force transmitter 51' of the rear-axle pressure modulator 14. The test circuit 91 detects in this manner from the comparison of the detected rear-axle braking pressure with the output signal characteristic of the braking pressure (which is low or does not exist with a failed front-axle brake circuit I) in the front-axle brake circuit I, of the force transmitter 51 of the front-axle brake circuit I and generates an output signal by way of which the processor 79 and the comparator 83 are made inoperative.

As a result, the open-loop pressure supply control valve 73 thereafter remains held in its flow position (its basic position 0) so that now braking pressure can be built up in the rear-axle brake circuit II by the tandem main cylinder 21. In this case, the piston 39' of the rear-axle pressure modulator 14 remains in its illustrated basic position, corresponding to the maximum volume of the output pressure space 12' of the rear-axle pressure modulator 14. Since the processor 79 and the comparator 83 are disconnected, the open-loop braking-pressure control valve 71 also remains held in its flow position 0 connecting the drive pressure space 41' of the rear-axle pressure modulator 14 to the pressureless storage reservoir 46 of the auxiliary pressure source 44.

The test output signal driving the closed-loop braking-pressure control valve 74 of the rear-axle brake circuit II into the blocked position I of the test circuit 91 is decoupled by an OR gate 93 from the comparator output 86 at which the output signals utilized for driving the closed-loop braking-pressure control valve 74 into its blocked position during servo control are emitted. The control signal, by way of which the open-loop pressure supply control valve 73 is driven into its blocked position when the front-axle brake circuit I is intact, is generated as a high-level output signal of a 3-input AND gate 94 which is supplied at a first non-negated input 96 with the output signal of the brake light switch 78 present as a high-level signal during an operation of the brake system 10, at a second, also non-negated input 97 with a high-level output signal of the comparator 83 which is characteristic of the proper operation of the brake system 10, and at a third negated input 98 with the test output signal of the test circuit 91 which is also generated as a high-level signal. Power amplifiers 99 are individually associated with the solenoid valves 7, 73 and 74 as output stages of the open-loop control stage 77.

Phases of lowering the braking pressure required in closed-loop antiblocking control operation at the rear-axle can be controlled by pulsed switching of the open-loop braking-pressure or ABS function control valve 79 between its two functional positions 0 and I. Braking-pressure holding phases can be achieved at the rear-axle braking circuit II by switching the closed-loop braking-pressure control valve 74 into its blocked position. The closed-loop antiblocking control at the front-axle brake circuit I can be similarly achieved, in which braking pressure can be built up or removed here at one wheel brake 16 while the braking pressure is held at its valve hitherto set at the other wheel brake 17 since a closed-loop braking-pressure control valve 63 and 64, respectively, is provided for each brake line branch 61 and 62.

Figure 2:
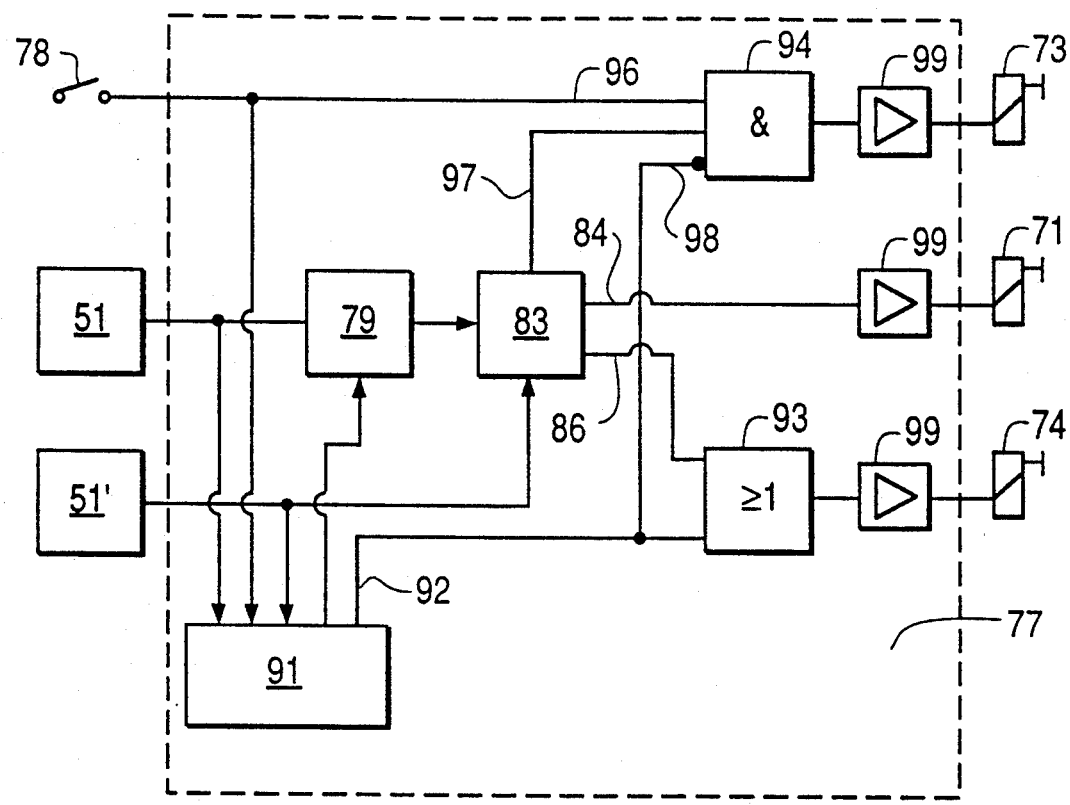
FIG. 2 is a block diagram of an open-loop control stage for servo control of the braking pressure in the rear-axle brake circuit of the brake system according to FIG. 1.

The control signals required for closed-loop control-conformal driving of the open-loop ABS function control valves 42 and 71 of the open-loop ABS control valve 57 of the front-axle brake circuit I and of the closed-loop braking-pressure control valves 63 and 64 of the front-axle brake circuit I and of the closed-loop braking-pressure control valve 74 of the rear-axle brake circuit II are generated by an electronic control unit 101 of the antiblocking system which also includes the open-loop control stage 77 (FIG. 2). Processing occurs in accordance with known criteria of output signals, containing the information on the dynamic behavior of the vehicle wheels, of wheel speed sensors 102 to 105 individually associated with the vehicle wheels, and of the output signal of the brake light switch 78 and of the output signals characteristic of braking pressure of the two force sensors 51 and 51'. Reference is made to DE 37 23 876 A1 for a more detailed explanation of the principle of the closed-loop antiblocking control with the aid of pressure modulators which are also equipped with force sensors.

The auxiliary pressure source 44 comprises a pressure accumulator 106 constructed as piston-spring energy storage device which can be charged up as required by a pump 107, constantly or selectively electrically driven for example by the vehicle engine, via an accumulator charging valve designated generally by the numeral 108. Between the pressure output 43 of the pressure accumulator 106, a non-return valve 111 is connected and charged in the direction of opening with a relatively higher pressure at the pressure output 109 of the pump 107 than in the pressure accumulator 106 and is otherwise blocked. Between the high-pressure output 43 of the pressure accumulator 106 and of the auxiliary pressure source 44 and its pressureless storage reservoir 40, respectively, a pressure-limiting valve 112, also shown as non-return valve, is connected. The opening pressure of valve 112 determines the maximum value of the pressure in the pressure accumulator 106.

The accumulator charging valve 108 shown in FIG. 1 is a pressure-controlled slide valve which operates as a 2/2-way valve which has a an illustrated flow position, in which the pump 107 operates in recirculating mode. In other words, the pump 107 pumps working medium sucked in from the storage reservoir 46 of the auxiliary pressure source 44 back into the reservoir 46. In an alternative blocked position the pressure output 109 of the pump 107 is blocked off against the storage reservoir 46 of the auxiliary pressure source 44 and the pump 107 therefore charges up the pressure accumulator 106 via the non-return valve 111.

The valve slider 115 of the accumulator charging valve 108 is urged into the flow position marked by a stop effect against the restoring force of a pretensioned restoring spring 117 by the output pressure of the pressure accumulator 106 coupled into the control pressure space 116 of the accumulator charging valve 108. The slider 115 is held in this position as long as the accumulator 106 is completely charged up. The restoring force developed by the restoring spring 117 in the shown end position of the valve slider 115, corresponding to the maximum flow cross-section of the valve flow path, is approximately equal to the force exerted by the pressure charging of the control pressure space 116 of the slide valve 108, with maximum accumulator pressure, on the valve slider 115 and holding the valve slider 115 against the limiting stop so that, when the accumulator pressure drops even slightly, for example more than 5%, the restoring spring 117 urges the valve slider 115 in the direction of the blocked position of the slide valve 108 since, as a result a throttling of the oil flow generated at the pump 107 and thus a pressure increase at the output 108 of the pump 107 occurs. Depending on how far the accumulator pressure had dropped, the charging operation starts even before the accumulator charging valve 102 hermetically blocks off the output 108 of the pump 107 against the storage reservoir 46 of the auxiliary pressure source 44.

The position of the valve slider 115 is monitored by an electronic position transmitter 118 whose output signal is a direct measure of the pressure prevailing in the pressure accumulator 106. The accumulator charging valve 108 and the front-axle pressure modulator 13 are arranged directly adjacently to one another, and their central longitudinal axes extend in parallel with one another. The modulator piston 39 is provided with a carrier arm 119 radially protruding from a slot of the housing part enclosing the annular space 52. The arm 119 engages a free front face 121 of the valve slider 115 and carries or contains the slider 115 when the modulator piston 39 moves out of its illustrated position and corresponding to a minimum volume of the output pressure space 11 of the pressure modulator 13 in the direction of a lowering of the pressure in the front-axle brake circuit I. As a result, the accumulator charging valve 108 passes into its blocked position. Consequently, a charging operating phase of the accumulator 106 is triggered the accumulator 106 is triggered and the accumulator 106 is charged up when subsequently the piston 39 of the front-axle pressure modulator 13 must be pushed back into its position corresponding to the minimum volume of the output pressure space 11.

Figure 4:
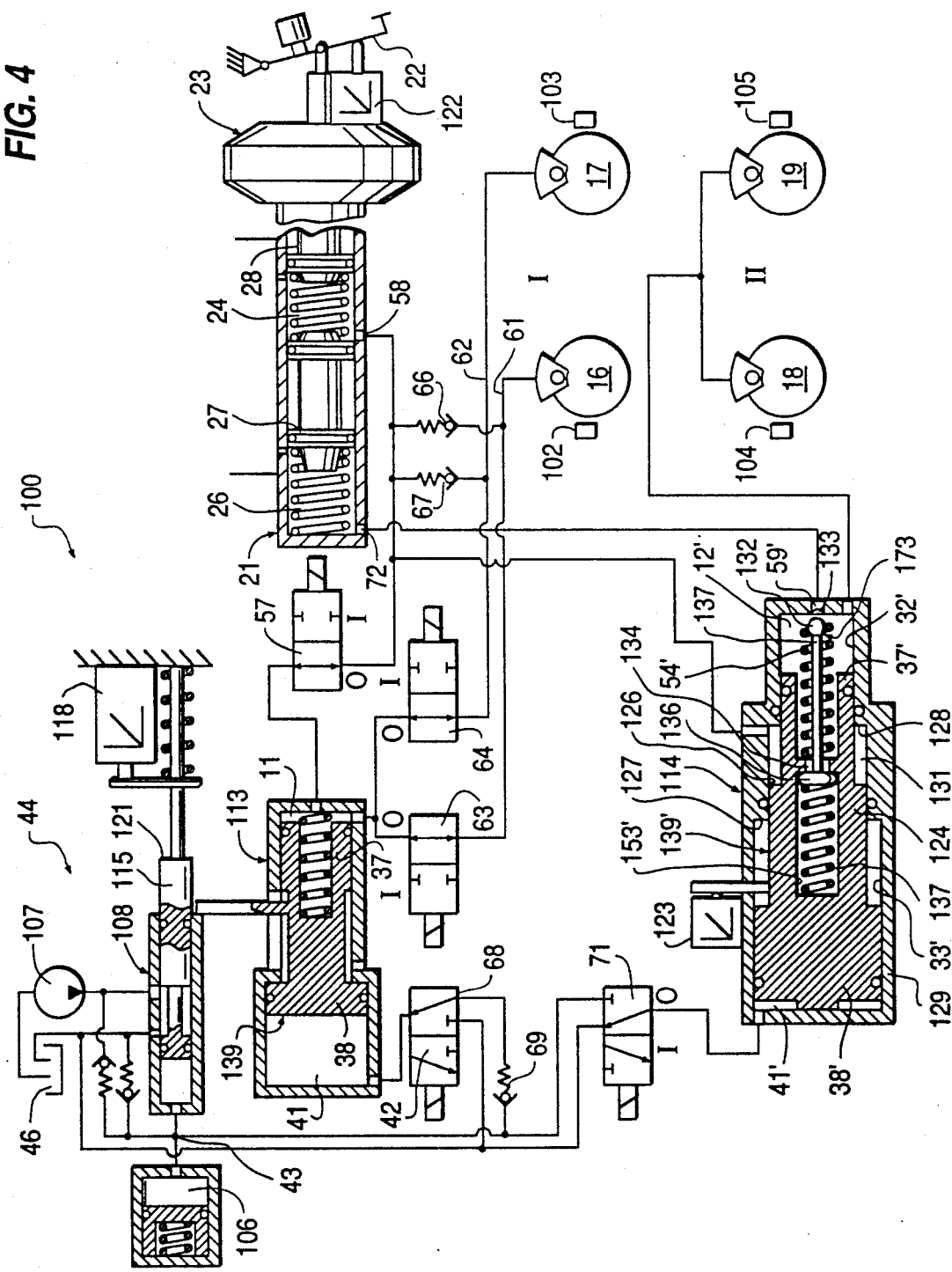
FIG. 4 is a second embodiment of a brake system according to the present invention, in which position transmitters are provided which monitor the position of the pressure rod piston of the brake device or the position of the piston of the pressure modulator provided for the braking pressure servco control for the detection of the braking pressures prevailing in the front-axle brake circuit and in the rear-axle brake circuit.

Another embodiment of a hydraulic dual-circuit brake system designated generally by the numeral 100 is shown in FIG. 4. The details of this embodiment largely correspond to the brake system 10 shown in FIG. 1 in configuration and operation and is identical with the latter with respect to the design of the brake device 21, of the auxiliary pressure source 44, of the brake circuit division (I, II), of the circuit arrangement and function of the solenoid valves 57, 63, 64 and 68 allocated to the front-axle brake circuit I and of the design and function of the open loop braking-pressure or ABS function control valve 71 allocated to the rear-axle brake circuit II. Therefore, the same structure in FIG. 4 uses the identical reference numerals used in FIG. 1. Where, in addition, elements are given the same reference symbols in FIG. 4 as elements in FIG. 1, this is also intended to be an indication of the constructional and functional equality or analogy of these elements and to signify a reference to their description given with reference to FIG. 1 in order to avoid unnecessary repetition.

The following differences exist in the brake system 100 according to FIG. 4 compared with the brake system 10 according to FIG. 1:

1. To detect the braking pressure in the front-axle brake circuit I, an electronic displacement transmitter 122 is provided to generate an output signal which is a direct measure of the position of the primary piston 28 of the tandem main cylinder 21 and thus, assuming correct operation of the brake system 100, is also a measure of the braking pressure in the front-axle brake circuit I.

2. The piston flanges 37 and 38, respectively, which movably delimit the output pressure space 11 and the drive pressure space 41 of the pressure modulator 113 associated with the front-axle brake circuit I of the modulator piston 139 are solidly connected to one another, for example constructed of one piece, since the pressure modulator 113 does not need an element corresponding to the force transmitter 51 because of the braking-pressure detection by the displacement transmitter 122. The remainder of the pressure modulator 113 of the front-axle brake circuit I is constructionally identical with the pressure modulator 13 according to FIG. 1.

3. To detect the braking pressure in the rear-axle brake circuit II, there is provided a further electronic displacement or position transmitter 123 whose output signal is a measure of the position of the piston 139' of the pressure modulator 114 associated with the rear-axle brake circuit II and thus also a measure of the braking pressure in the rear-axle brake circuit II. Accordingly, no element corresponding to the force transmitter 51' of the pressure modulator 14 according to FIG. 1 is provided with the rear-axle pressure modulator 114.

4. The open-loop pressure supply control valve 173, which functionally corresponds to the open-loop pressure supply control valve 73 according to FIG. 1 and blocks off the output pressure space 12' of the rear-axle pressure modulator 114 against the secondary output pressure space 26 of the brake device 21 with the beginning of a braking action, is configured as a mechanical seat valve integrated into the rear-axle pressure modulator 114.

5. The operation of the rear-axle pressure modulator 114 resulting from the modifications mentioned above in numbered paragraphs 3 and 4 will now be explained in detail.

The rear-axle modulator 114 is a 3-step piston which has between its piston step 38', which forms the moving boundary of the drive pressure space 41' and has the largest diameter, and its piston step 37', which forms the moving boundary of the output pressure space 12' and has the smallest diameter, a piston step 124 with a medium diameter. The piston step 124 is sealed displaceably with respect to a medium-sized bore step 126 of the modulator housing 129 which is offset by radial housing steps 127 and 128 with respect to the bore step 33', which has the largest diameter, and bore step 32' which has the smallest diameter, of the modulator housing 129. The medium-sized piston step 124 and the smallest piston step 37' delimit within the medium-sized bore step 126 of the modulator housing 129 an annular space 131 which is communicatingly connected to the pressure output 58, associated with the front-axle brake circuit I, of the tandem main cylinder 21. This annular space 131 thus forms a second output pressure space which is connected in parallel with the primary output pressure space 24 of the tandem main cylinder 21 and is associated with the front-axle brake circuit I, from which brake fluid is also displaced into the front-axle brake circuit I when the modulator piston 139' is displaced in the direction of a braking-pressure build up in the rear-axle brake circuit II by pressure charging of drive pressure space 41' with the output pressure of the auxiliary pressure source 44. Compared with a conventional tandem main cylinder for a brake system, the system illustrated in FIG. 4 makes it possible to select relatively smaller piston cross-sections. In the case of a malfunction of the front-axle brake circuit I, the present invention thus has the advantage that then correspondingly higher braking pressures can be achieved with a predetermined actuating force in the rear-axle brake circuit II.

The open-loop pressure supply control valve 173 of the rear-axle pressure modulator 114 shown in FIG. 4 is a ball seat valve which has a valve ball 132 arranged in the illustrated position of the modulator piston 139', which corresponds to the non-actuated state of the brake system 100, at a small axial distance from the valve seat 133, which changes over into the pressure output 59', and comes after a small initial movement of the actuating stroke of the modulator piston 139', into sealing contact with the valve seat 133.

The blind hole-shaped axial recess 153' of the modulator piston 139' is open towards the output pressure space 12' of the rear-axle pressure modulator 114 and extends into the immediate vicinity of its larger piston flange 38'. The recess 153' is provided in its central area with a radially inwardly-directed annular shoulder 134 which has a side facing the output pressure space 12' engaged by the restoring spring 54' which urges the modulator piston 139' into its illustrated basic position. At the opposite, inner side of this annular shoulder 134, a support ring 136 is supported, seen in the illustrated basic position of the modulator piston 139 in FIG. 4, to which the valve ball 132 is firmly joined via an elongated plunger 137 which penetrates through the central opening of the annular shoulder 134. A pre-tensioned valve spring 137 extends between the support ring 136 and the bottom of the blind hole-shaped recess 153', and holds the support ring 136, seen in the illustrated basic position of the modulator piston 139', in contact with the annular shoulder 134. The valve spring 137 is resilient to such an extent that it does not limit the braking-pressure build-up stroke of the modulator piston 139'.

Figure 5:
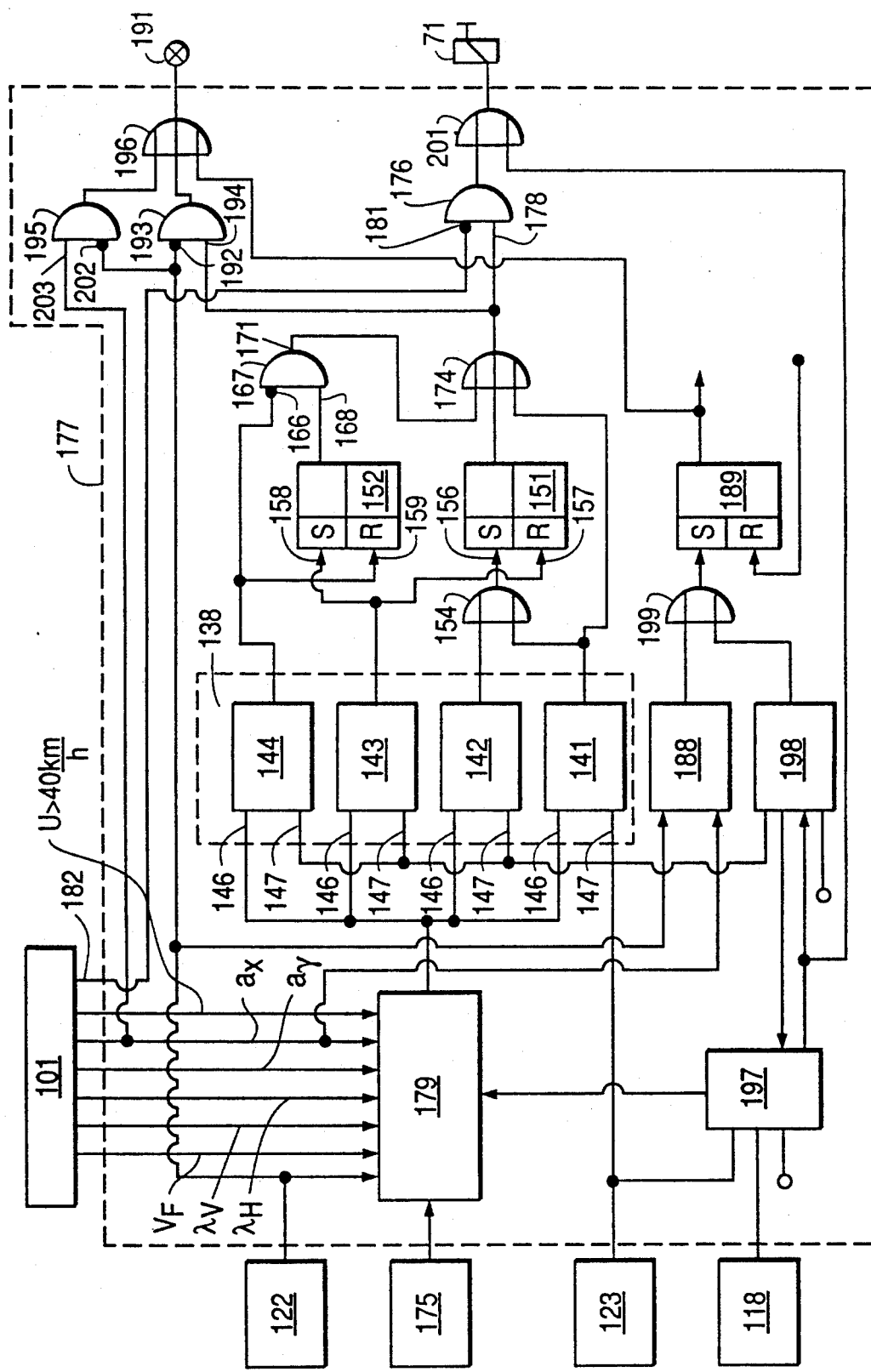
FIG. 5 is a block diagram of an open-loop control stage for controlling the braking force distribution in the brake system according to FIG. 4.
Figure 6A:
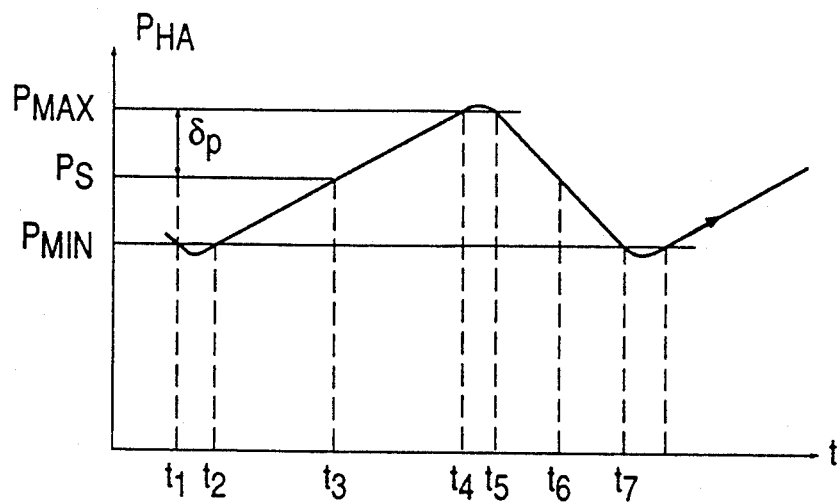
FIGS. 6a, 6b, 6c, 6d, 6e, 6f, 6g and gh are pulse timing diagrams for explaining the operation of the open-loop control stage according to FIG. 5.
Figure 6B:
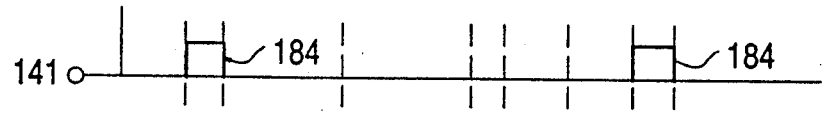
Figure 6C:
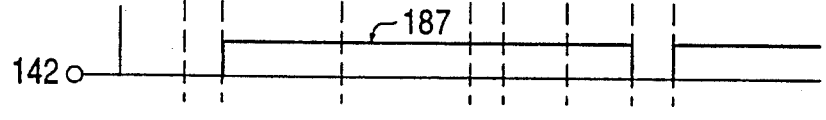
Figure 6D:
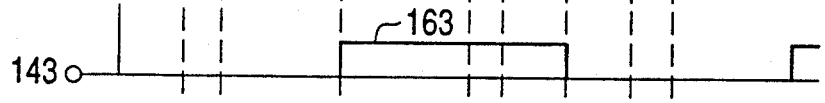
Figure 6E:
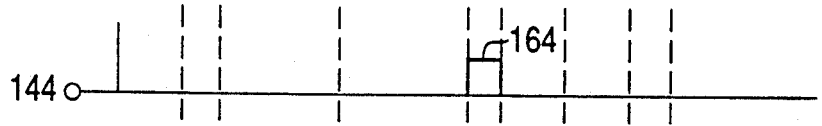
Figure 6F:
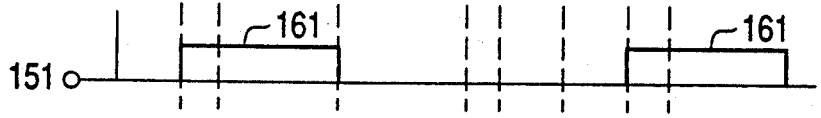
Figure 6G:
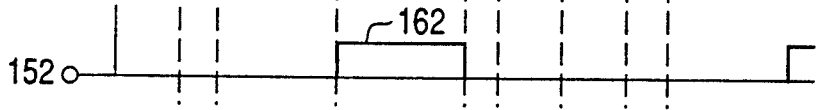
Figure 6H:
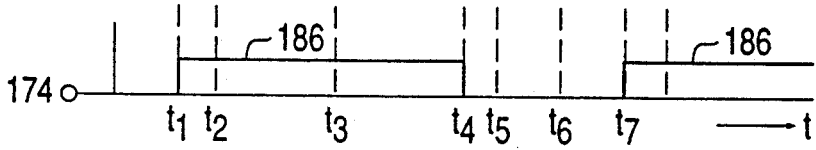

To explain an open-loop control stage 177 suitable for the brake system 100 according to FIG. 4 and largely analogous to open-loop control state 77 according to FIG. 2, reference will now be made to the block diagram of FIG. 5 which shows the basic configuration of this open-loop control stage 177.

The central functional element of this open-loop control stage 177 is again a processor 179 which calculates from vehicle-specific data, namely the axle-load distribution of the rear-axle load and the wheel-base related height of the center of gravity of the vehicle and of the loading situation of the vehicle and further data which contains information on the dynamic travelling situation of the vehicle, namely the vehicle speed $v_F$, values $\lambda_V$ and $\lambda_H$ of the brake slip at the front axle and the rear axle, the longitudinal vehicle deceleration $a_X$ and, if necessary, a transverse acceleration $a_Y$ acting on the vehicle when travelling through a curve, taking into consideration the design of the brake system 100, value pairs $P_{VA}$, $P_{HA}$ which, when adjusted, result in a front-axle/rear-axle braking force distribution which correspond to optimum utilization of friction locking at the front and the rear axle of the vehicle, again with the constraint that the vehicle must remain dynamically stable during a braking action.

The dynamic data $v_F$, $\lambda_V$ and $\lambda_H$ and $a_X$ and $a_Y$ can be obtained from an evaluation of the output signals of the wheel speed sensors 102 to 104 by the electronic control unit 101 of the ABS and entered into the processor 179. Since the determination of a centrifugal or transverse acceleration $a_Y$ occurring when traveling through a curve, which can result in considerable relieving of the load particularly on the rear wheel speeds which differ when traveling through a curve in proportion with the speed, although possible in principle, can only be effected in practice with considerable inaccuracy, it is suitable to provide a separate transverse acceleration sensor 175 of a known type for detecting a transverse vehicle acceleration $a_Y$ and generating an electrical output signal which can be input into the processor 179.

Entering an output signal of the electronic position transmitter 122 which is characteristic of the front-axle braking pressure $P_{VA}$ controls the output of the set point $P_S$ of the rear-axle braking pressure $P_{HA}$ which is most advantageous with respect to this measured front-axle braking pressure $P_{VA}$ in the sense explained above. The set point is entered into a comparator circuit designated generally by the numeral 138, and is processed by this circuit to form the output signals needed for driving the open-loop braking-pressure control valve 71.

With respect to the tolerance band 87 explained above with reference to FIG. 3, $P_{min} < P_S < P_{max}$, within the rear-axle braking pressure $P_{HA}$ follows its set point $P_S$, the possible values are represented by the parabola 82 of a "quasi-ideal" braking-force distribution in the diagram of FIG. 3. The information already presented with respect to this diagram analogously applies to the system of FIG. 4. The possible set of values of the upper threshold values $P_{max}$ is represented by the boundary curve 88 and the set of possible lower threshold values $P_{min}$ is represented by the boundary curve 89 of the diagram of FIG. 3.

The comparator circuit 138 comprises four comparators 141, 142, 143 and 144, each of which is supplied at a reference signal input 146 with the output signal of the processor 179 characteristic of the set point $P_S$ of the rear-axle braking pressure and at a reference signal input 147 with the output signal of the position transmitter 123 characteristic of the actual value $P_{HA}$ of the rear-axle braking pressure and which monitors the position of the modulator piston 139' of the rear-axle braking-pressure modulator 114.

The first comparator 141 of the comparator circuit 138 internally forms from the $P_S$ set point signal the reference quantity $P_{min}$ in accordance with the relation $$P_{min} = P_S - \delta P.$$

where $\delta P$ has a value of a few bar, for example of 5–10 bar, and compares the actual value $P_{HA}$, of the rear-axle braking pressure detected by position transmitter 123, with this reference quantity $P_{min}$. The first comparator 141 generates an output signal having a high logical signal level (logical I) when and as long as the rear-axle braking pressure $P_{HA}$ is less than the reference quantity $P_{min}$.

The second comparator 142 also compares the actual value $P_{HA}$ of the rear-axle braking pressure with the correspondingly formed reference quantity $P_{min}$ and outputs at its output a high level signal (logical I) when and as long as the rear-axle braking pressure $P_{HA}$ is greater than the reference quantity $P_{min}$.

The third comparator 143 of the comparator circuit 138 directly compares the actual value $P_{HA}$ of the rear-axle braking pressure with its set point $P_S$ supplied by the processor 179 and outputs a logical high level output signal when and as long as the rear-axle braking pressure $P_{HA}$ is greater than its set point $P_S$.

The fourth comparator 144 again internally forms from the set point $P_S$ of the rear-axle braking pressure supplied by the processor 179 the reference quantity $P_{max}$ in accordance with the relation $$P_{max} = P_S + \delta P$$

and again compares the actual value $P_{HA}$ of the rear-axle braking pressure with this reference quantity. The output signal of this fourth comparator 144 is a logical high level output signal when and as long as the rear-axle braking pressure $P_{HA}$ is greater than the reference quantity $P_{max}$ formed in this manner.

For a further explanation of the open-loop control stage 177 and its function, reference will now also be made to the timing diagram of FIG. 6 which shows the variation with time of the rear-axle braking pressure (portion (a) of FIG. 6), the variation with time of the output signal for the first comparator 141 (portion (b) of FIG. 6), the variation with time of the output signal of the second comparator 142 (portion (c) of FIG. 6), the variation with time of the output signal of the third comparator 143 (portion (d) of FIG. 6), the variation with time of the output signal of the fourth comparator 144 (portion (e) of FIG. 6), the variation with time of the output signals of two SR-type flip flops 151 and 152 (portions (f) and (g) of FIG. 6), which can be set to high logical output signal level and reset to low output signal level with rising edges of the comparator output signals, and the output signal of an OR gate 174 (portion (h) of FIG. 6), via which the open-loop braking-pressure control valve 71 is driven, for one braking-pressure control cycle.

The output of the first comparator 141 and the output of the second comparator 142 are connected to the set input 156 of the first SR-type flip flop 151 via a 2-input OR gate 154. The output of the third comparator 143 is connected, on the other hand, to the reset input 157 of this first SR-type flip flop 151 and, on the other hand, to the set input 158 of the second SR-type flip flop 152. The reset input 159 of the second SR-type flip flop is connected to the output of the fourth comparator 144. These two SR-type flip flops 151 and 152 are configured as rising edge-controlled flip flops whose Q-output signals change to a high output signal level, or retain this level, with the onset of a high-level output signals supplied to the respective set input 156 and 158, respectively, and are reset to a low output signal level (logical 0) or remain at this level with the onset of a high-level signal 163 and 164, respectively, supplied to their reset input 157 and 159, respectively. The falling of the set and reset signals does not influence the output signal level of flip flops 151 and 152.

The output of the fourth comparator 144 is also connected to one, negated input 166 of a 2-input AND gate 167 whose non-negated second input 168 is connected to the Q-output 169 of the second SR-type flip flop 152. Output 171 of the AND gate 167, the Q-output 172 of the first flip flop 151 and the output of the first comparator 141 are each connected to one of the inputs of the 3-input OR gate 174 by the high-level output signals of which the open-loop braking-pressure control valve 71 can be switched into its excited position I in which the drive pressure space 41' of the rear-axle pressure modulator 114 is connected to the pressure output 42 of the auxiliary pressure source 44. The control signals emitted by the 3-input OR gate 174 are forwarded to the control solenoid of the open-loop braking-pressure control valve 71 via a 2-input AND gate 176, acting as a gate circuit, which has a non-negated first input 178 connected to the output of the 3-input OR gate 174 and a negated second input 181 which is connected to a control output 182 of the electronic ABS control unit 101 at which the latter emits a high-level output signal when braking pressure must be removed at the rear-axle.

The open-loop control stage 177, whose basic configuration has been explained thus far operate in detail in a typical braking-pressure adjusting cycle at the rear-axle brake circuit II of the brake system 100 as follows. The "settled" state is considered for the sake of simplicity and the following explanation to result when the driver, after initiating the braking action, keeps the pedal actuating force constant or largely constant and the processor 179 accordingly outputs a correspondingly constant set point $P_S$ for the rear-axle braking-pressure.

For the illustrative explanation of FIG. 6, it shall be assumed that the actual value $P_{HA}$ of the rear-axle braking-pressure, the variation of time of which is reproduced by curve 183, reaches the lower limit value $P_{min}$ of the tolerance band 87 and drops slightly below it in its further variation. This triggers the high-level output pulse 184 of the first comparator 141 at time $t_1$ (portion (b) of FIG. 6). With the onset of this high-level output pulse 184, the Q-output signal 161 of the first SR-type flip flop 151 is also a high-level signal set to a high output signal level at time $t_1$. Correspondingly, the output signal 186 of the 3-input OR gate 174 is from time $t_1$ also a high-level signal by way of which the open-loop braking-pressure control valve 71 is switched into its excited position I connecting the drive pressure space 41' of the rear-axle pressure modulator 114 to the high-pressure output 43 of the auxiliary pressure source 44. As a result, the rear-axle pressure modulator 114 is driven into the braking-pressure build-up mode of operation.

When the rear-axle braking-pressure $P_{HA}$ again reaches or exceeds the lower limit value $P_{min}$ of its tolerance band 87 at time $t_2$, the output signal 184 of the first comparator 141 drops back again to a lower signal level but the output signals 161 and 186 of the first SR-type flip flop 151 and of the 3-input OR gate 174 still remain present as high-level signals and the braking-pressure build-up mode is maintained. At time $t_2$, the output signal 187 (portion (c) of FIG. 6) of the second comparator 142 also changes to high signal level. With the onset of this high-level output signal 187 of the second comparator 142, the closed-loop control can be triggered in an initial phase of a braking action if this control operates in a situation in which the rear-axle braking-pressure $P_{HA}$ has a value between $P_{min}$ and $P_S$. The output signals of the first SR-type flip flop 151 and of the OR gate 174 remain present as high-level signals. As soon as the rising rear-axle braking-pressure $P_{HA}$ reaches the set point $P_S$ at time $t_3$, the high-level output signal 163 of the third comparator 143 is triggered (portion (d) of FIG. 6).

With the onset of this high-level output signal 163 of the third comparator 143, the Q-output signal 161 of the first SR-type flip flop 151 is reset to a low output signal level but, at the same time, the Q-output signal 162 of the second SR-type flip flop 152 is set to a high output level so that the output signal of the 3-input OR gate 174 still remains a high-level output signal. This keeps the rear-axle pressure modulator 114 in braking-pressure build-up mode. As soon as the rear-axle braking-pressure $P_{HA}$ reaches and slightly exceeds the upper limit value $P_{max}$ of its tolerance band 87 at time $t_4$, the high-level output signal 164 of the fourth comparator 144 is triggered with the onset of which the Q-output signal 162 of the second SR-type flip flop 152 is now also reset to a low signal level as a result of which the output signal 186 of the 3-input OR gate 174 is also reset back to a low output signal level. The braking-pressure removal mode of operation of the rear-axle pressure modulator 114 is thus initiated.

The high-level output signal 164 of the fourth comparator 144 drops at time $t_5$ at which the rear-axle braking-pressure $P_{HA}$ again drops below the upper limit value $P_{max}$ and the high-level output signal 163 of the third comparator 143 drops at time $t_6$ at which the rear-axle braking-pressure $P_{HA}$ drops below the set point $P_S$. At time $t_7$, the rear-axle braking pressure $P_{HA}$ again drop below the lower limit $P_{mix}$ of its tolerance band 87 as a result of which, finally, the output signal 187 of the second comparator 142 also again drops back to a low signal level. At the same time, the high-level output signals 184, 161 and 186 of the first comparator 151, of first SR-type flip flop 151 and of the 3-input OR gate 174 are again triggered at time $t_7$ as immediately after time $t_1$. Thus, the same sequence of individual output and control signals is obtained for further closed-loop control phases of the braking-pressure servo control at the rear-axle brake circuit II as for the closed-loop control cycle which took place within the time interval between time $t_1$ and $t_7$, as a result, therefore, of a variation of the rear-axle braking-pressure between its upper and lower limit values $P_{max}$ and $P_{min}$, even if these, together with the set point $P_S$ of the rear-axle braking-pressure $P_{HA}$, are subject to continuous variation.

As a safety device, a comparison processor 188 is provided in the open-loop control stage 177. The processor 188 is inputted with, on the one hand, the longitudinal vehicle deceleration $a_X$ and, on the other hand the front-axle braking pressure $P_{VA}$, detected by the position transmitter 122. If the vehicle deceleration $a_X$ is distinctly less than would be expected in accordance with the position output signal of the position transmitter 122, this is evaluated as a failure of the front-axle brake circuit I by the comparison processor 188 which generates a warning output signal by virtue of which the output signal of a further SR-type flip flop 189 is set to a high-level and, for example, a warning lamp 191 can be operated.

The output signal of the position transmitter 122 forming a measure of the front-axle braking-pressure is also supplied to a negated input 192 of 2-input AND gate 193 which is supplied at its other non-negated input 194 with the output signal of the 3-input OR gate 174. A high-level output signal of this 2-input AND gate 193 is an indication of the fact that the comparator stage 138 and/or one of the flip flops 151 and 152 or one of the logic elements 154, 167 and/or 174 of the open-loop control stage 177 has failed and is therefore also utilized for operating the warning lamp 191. The outputs of the 2-input AND gate 193 and of the SR-type flip flop 189 are decoupled by a 3-input OR gate 196 which is supplied, as a further input signal, with the output signal of a 2-input AND gate 195 which has a negated first input 202 and is supplied with the output signal of the position transmitter 122 associated with the front-axle brake circuit I and a non-negated second input 203 which is supplied with the deceleration-characteristic output signal of the ABS control unit 101. A high-level output signal of this AND gate is an indication of the fact that the position transmitter 122 has failed and is also utilized for operating the warning lamp 191.

Furthermore, a test circuit 197 i provided which, when the ignition is switched on when the vehicle is standing still, emits an output signal by means of which the open-loop braking-pressure control value 71 is driven for a limited period of time into its excited position I; that is to say, the drive pressure space 41' of the rear-axle pressure modulator 114 is charged with the output pressure of the auxiliary pressure source 44. This and the brake fluid volume which can be displaced at a maximum from the output pressure space 12' of the rear-axle pressure modulator 114 are sized in such a manner that, assuming a good degree of venting of the rear-axle brake circuit II, the equilibrium position, which can be detected by the position transmitter 123, of the modulator piston 139' is reached at approximately one half of its maximum distance of displacement.

If the pressure charging of the drive pressure space 41' achieved in this manner leads to the pressure modulator piston 139' executing its maximum possible displacement stroke, this is evaluated by a further comparison processor 198 to the effect that the rear-axle brake circuit II has failed. The processor 198 generates a signal characteristic of this failure, by way of which the further SR-type flip flop 189 is also set to a high output signal level and the warning lamp 191 is operated. An OR gate 199 is again provided for decoupling the output signal of the further comparison processor 198 from that of the comparison process 188.

If the stroke of the modulator piston 139' of the rear-axle pressure modulator 114, which can be detected by the position transmitter 123, has an amount which is between its maximum and its minimum value, this is evaluated by the test circuit 197 as a more or less poor degree of venting of the rear-axle brake circuit II. An input characteristic of this degree of venting is generated for the processor 179 which evaluates this input to increase the set point $P_S$ of the rear-axle braking-pressure $P_{HA}$. As a result, the poor degree of venting of the rear-axle brake circuit II is compensated for.

The output signal of the test circuit 197 communicating the test drive to the open-loop braking-pressure control valve 71 is also decoupled with respect to the output signal of the AND gate 176 by an OR gate 201.

In the event of a failure of the front-axle brake circuit I, the brake system 100, in which the position transmitters 122 and 123 are provided as pressure sensors, has the characteristic that the braking-pressure build-up at the rear-axle brake circuit II controlled by the pressure modulator 114 already starts with the onset of the displacement movement of the primary piston 28 of the tandem main cylinder 21. This occurs because the set point input for the rear-axle braking-pressure, and thus the activation of the pressure modulator 114 in the direction of a braking pressure build-up at the rear-axle brake circuit II, already starts with the output signal of the position transmitter 122 characteristic of the position of the primary piston 28.

In the brake system 10 described with reference to FIGS. 1-3, pressure sensors can also be used instead of the force sensors 51 and 51', implemented, for example, by diaphragms exposed to the output pressure of the pressure modulators 13 and 14 to which strain gauges are attached. The strain gauge emit electrical output signals proportional to the amounts of bending of the diaphragm resulting from the pressure charging of the diaphragm. The signals thus also constitute a direct measure of the respective braking pressures $P_{VA}$ and $P_{HA}$ and can therefore be processed by the electronic open-loop control stage 77 of the electronic control unit 101 in basically the same manner as the output signals of force transmitters 51 and 51'. Required adaptations of the open-loop control stage 77 or of the control unit 101, respectively, to the output signal levels of the pressure transmitters and their output resistances, which are necessary when using strain gauges instead of force transmitters of the type described above, are within the level of skill of the person in this technology so that relevant electronic circuit details do not need to be discussed. The same applies analogously to the case where in a brake system 100 having the basic configuration described with reference to FIG. 4, pressure transmitters are also used instead of displacement transmitters.

Furthermore, it is advantageous in the sense of optimum utilization of the braking forces which can be applied via the rear-wheel brakes if, in a braking situation in which the antiblocking system first operates at the front-axle, the braking-pressure is thereupon increased at the rear-axle so that this also reaches closed-loop antiblocking control mode as quickly as possible and also to this extent to force, as it were, a best-possible approximation of an ideal front-axle/rear-axle braking force distribution.

Figure 7:
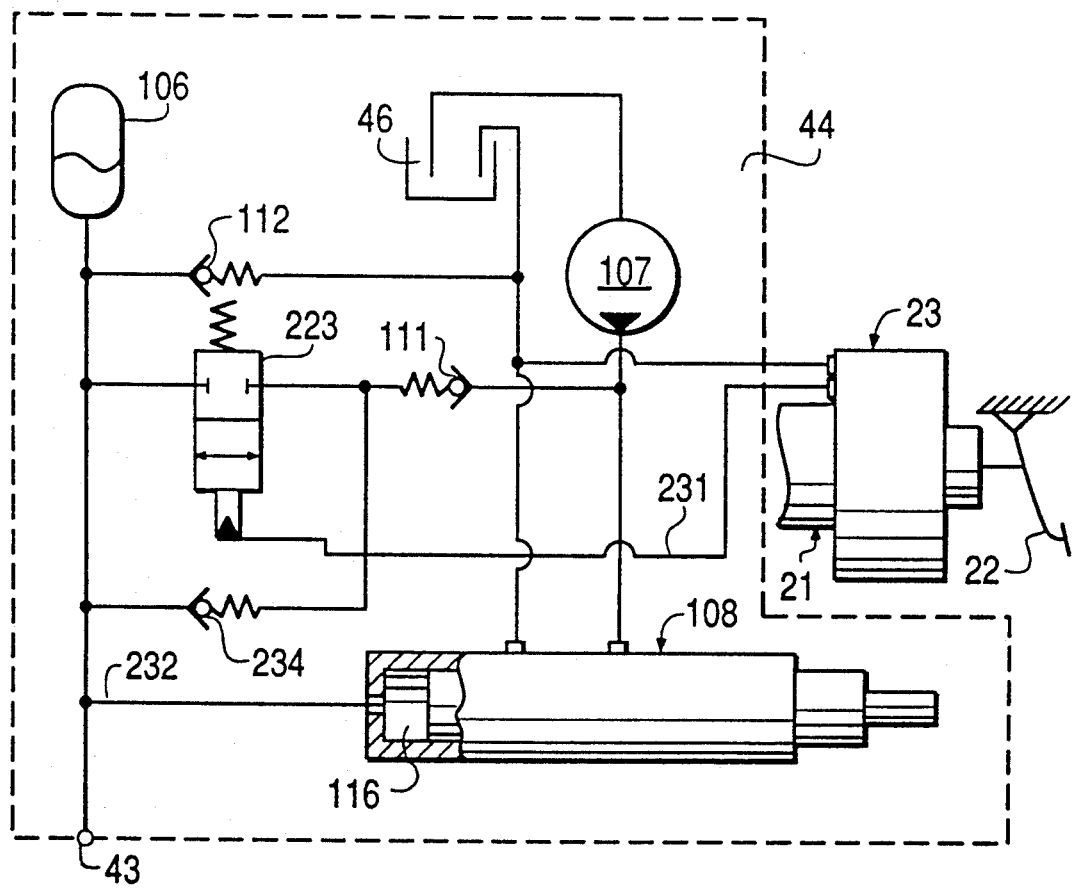
FIG. 7 is a block diagram of a presently preferred configuration of the auxiliary pressure source of the brake system when the latter is equipped with a hydraulic braking force amplifier.

Referring to FIG. 7, the details of which will now be referred to, a supplementary modification of the auxiliary pressure source 44 explained with reference to FIG. 1 will now be explained. This embodiment is of advantage particularly when the tandem main cylinder 21 is actuated via a hydraulic braking force amplifier 23 which is also supplied with pressure by utilizing the auxiliary pressure source 44. In this arrangement a supply line 231 is provided for this auxiliary pressure to convey the pressure supply to the braking force amplifier 23 and is connected to the output side of the output non-return valve 111 of the pump 107 of the auxiliary pressure source 44. In contrast to the auxiliary pressure source 44 of FIG. 1, a pressure-control priority valve 223 and in hydraulic parallel circuit therewith a non-return valve 234 which assumes its blocked position by a relatively higher pressure at the output side of the output non-return valve 111 of the pump 107 than in the pressure accumulator 106, are connected between the pressure medium line 232 connecting the pressure accumulator 106 to the control pressure space 116 of the accumulator charging valve 108 and the output side of the output non-return valve 111 of pump 107 in the design of the auxiliary pressure source 44.

The priority valve 223 is driven with the output pressure of the auxiliary pressure source present from the output side of the output non-return valve 111. The priority valve 223 is constructed as a 2/2-way valve, the illustrated basic position 0 of which is its block position. The valve 223 is only driven into its flow position I, in which a charging of the pressure accumulator 106 is possible, from a relatively high minimum pressure at the output side of the output non-return valve 111 of the pump 107.

The purpose of this embodiment of the auxiliary pressure source is that in a situation requiring full braking but in which the accumulator 106 requires charging, the output pressure of the pump 107 is first supplied to the braking force amplifier 23 in order to be able to utilize its amplifier action before the accumulator 106 is subsequently charged up.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A hydraulic dual-circuit brake system for a road vehicle, with a division of a front-axle brake circuit and a rear-axle brake circuit, comprising a braking-pressure generator having two output pressure spaces, each allocated to one of the two brake circuits, in which static pressure is built up proportionally to an actuating force; and electro-hydraulic open-loop braking-pressure control device which, in at least one of closed-loop control phases of a closed-loop antiblocking and of a closed-loop drive slip control device with which the vehicle is also equipped, determines control of braking-pressure changing and braking-pressure holding phases, so as, in normal braking operation, to convey an adjustment of front-axle/rear-axle braking force distribution to an extent which at least approximately corresponds to an ideal braking force distribution both in a partial and in a full-braking range, the open-loop control device comprising sensors operatively arranged to generate electric output signals characteristic of the braking pressures and coupled into the brake circuits, an electronic open-loop control stage to which the output signals of the sensors are supplied as inputs to generate from a comparative processing of actual values, represented by the output signals of the sensors, of the braking force distribution with set points charcteristic of ideal braking force distribution, which are determined from vehicle-specific data in combination with data characteristic of ideal braking force distribution determined from vehicle-specific data in combination with data characteristic of at least one of an operating situation and a loading situation of the vehicle, electrical control signals required for driving the braking-pressure actuator, and a pressure modulator having an output pressure space movably delimited in a pressure-tight manner with respect to the drive pressure space by a piston and which is operatively connected to an associated brake circuit and also to an output pressure space of the braking-pressure generator, the output pressure space of the modulator being blocked off against the output pressure space of the braking-pressure generator with which the outlet pressure space of the braking-pressure actuator pressure modulator is associated in normal braking operation, and pressure build-up in one of the front-axle brake circuit and rear-axle brake circuit connected to the output pressure space of the pressure modulator is effected by valve-control pressure charging of the drive pressure space with output pressure of an auxiliary pressure source, the pressure build-up in the one brake circuit connected to the output pressure space of the pressure modulator being implemented by a servo control, for which a set point for the braking pressure in the brake circuit connected to the pressure modulator, correlated with the braking pressure in the other of the two brake circuits is an ideal value or approximately ideal value is utilized as a reference variable.

2. The brake system according to claim 1, wherein the braking-pressure generator is a tandem main cylinder in which one of the two output pressure spaces is a primary output pressure space associated with the front-axle brake circuit and the other of the output pressure spaces is a secondary output pressure associated with the rear-axle brake circuit, and the rear-axle brake circuit is connected to the output pressure space of the pressure modulator.

3. The brake system according to claim 1, wherein the closed-loop antiblocking control is also effected at the one of the brake circuits which, during normal braking action, is operatively connected to the output pressure space of the braking-pressure generator, in accordance with a principle of changing the braking pressure by the pressure modulator arranged to be connected, via a solenoid valve, to one of the pressure output of the auxiliary pressure source and a pressureless storage reservoir of the auxiliary pressure source, the drive pressure space being charged with the output pressure source during normal braking action and, as a result, the piston being held in the position associated with a minimum volume of the output pressure space, and the output pressure space of the pressure modulator being connected to the associated output pressure of the braking-pressure generator during a normal braking action and being blocked off thereagainst in a closed-loop anitblocking control.

4. The brake system according to claim 3, wherein a tandem main cylinder is the braking-pressure generator having a primary output pressure associated with the front-axle brake circuit and a secondary output pressure associated with the rear-axle brake circuit, and the rear-axle brake circuit is connected to the output pressure space of the pressure modulator.

5. The brake system according to claim 3, wherein a force sensor integrated into the piston of the respective pressure modulator generates the output signal characteristic of the braking pressure in at least one of the two brake circuits.

6. The brake system according to claim 5, wherein a tandem main cylinder is the braking-pressure generator having a primary output pressure associated with the front-axle brake circuit and a secondary output pressure associated with the rear-axle brake circuit, and the rear-axle brake circuit is connected to the output pressure space of the pressure modulator.

7. The brake system according claim 2, wherein a position transmitter for monitoring the position of one of a primary piston and a brake pedal of the braking pressure generator is a sensor for generating the output signal characteristic of the braking pressure in the front-axle brake circuit.

8. The brake system according to claim 7, wherein the closed-loop antiblocking control is also effected at the one of the brake circuits which, during normal braking action, is operatively connected to the output pressure space of the braking-pressure generator, in accordance with a principle of changing the braking pressure by the pressure modulator arranged to be connected, via a solenoid valve, to one of the pressure output of the auxiliary pressure source and a pressureless storage reservoir of the auxiliary pressure source, the drive pressure space being charged with the output pressure source during normal braking action and, as a result, the piston being held in the position associated with a minimum volume of the output pressure space, and the output pressure space of the pressure modulator being connected to the associated output pressure of the braking-pressure generator during a normal braking action and being blocked off thereagainst in a closed-loop antiblocking control.

9. The brake system according to claim 8, wherein a force sensor integrated into the piston of the respective pressure modulator generates the output signal characteristic of the braking pressure in at least one of the two brake circuits.

10. The brake system according to claim 2, wherein a position transmitter for detecting the position of the piston of the pressure modulator associated with the rear-axle brake circuit is a sensor for generating the output signal characteristic of the braking pressure in the rear-axle brake circuit.

11. The brake system according to claim 10, wherein the closed-loop antiblocking control is also effected at the one of the brake circuits which, during normal braking action, is operatively connected to the output pressure space of the braking-pressure generator, in accordance with a principle of changing the braking pressure by the pressure modulator arranged to be connected, via a solenoid valve, to one of the pressure output of the auxiliary pressure source and a pressureless storage reservoir of the auxiliary pressure source, the drive pressure space being charged with the output pressure source during normal braking action and, as a result, the piston being held in the position associated with a minimum volume of the output pressure space, and the output pressure space of the pressure modulator being connected to the associated output pressure of the braking-pressure generator during a normal braking action and being blocked off thereagainst in a closed-loop antiblocking control.

12. The brake system according to claim 11, wherein a force sensor integrated into the piston of the respective pressure modulator generates the output signal characteristic of the braking pressure in at least one of the two brake circuits.

13. The brake system according to claim 12, wherein a position transmitter for monitoring the position of one of the primary piston the brake pedal of the brake device is a sensor for generating the output signal characteristic of the braking pressure in the front-axle brake circuit.

14. The brake system according to claim 2, wherein a reference signal is formed as a function of vehicle-specific data comprising axle load distribution, rear axle load, wheelbase-related height of center of gravity, the loading situation and at least one characteristic of an operating situation including at least one of front axle and rear axle brake slip vehicle speed, longitudinal vehicle deceleration, and transverse vehicle acceleration.

15. The brake system according to claim 14, wherein the closed-loop antiblocking control is also effected at the one of the brake circuits which, during normal braking action, is operatively connected to the output pressure space of the braking-pressure generator, in accordance with a principle of changing the braking pressure by the pressure modulator arranged to be connected, via a solenoid valve, to one of the pressure output of the auxiliary pressure source and a pressureless storage reservoir of the auxiliary pressure source, the drive pressure space being charged with the output pressure source during normal braking action and, as a result, the piston being held in the position associated with a minimum volume of the output pressure space, and the output pressure space of the pressure modulator being connected to the associated output pressure of the braking-pressure generator during a normal braking action and being blocked off thereagainst in a closed-loop antiblocking control.

16. The brake system according to claim 15, wherein a force sensor integrated into the piston of the respective pressure modulator generates the output signal characteristic of the braking pressure in at least one of the two brake circuits.

17. The brake system according to claim 16, wherein a position transmitter for monitoring the position of one of the primary piston and the brake pedal of the brake device is a sensor for generating the output signal characteristic of the braking pressure in the front-axle brake circuit.

18. The brake system according to claim 17, wherein a position transmitter for detecting the position of the piston of the pressure modulator associated with the rear-axle brake circuit is a sensor for generating the output signal characteristic of the braking pressure in the rear-axle brake circuit.

19. The brake system according to claim 14, wherein a separate sensor is provided for detecting transverse vehicle acceleration.

20. The brake system according to claim 2, wherein at least for detection of a failure of the front-axle brake circuit, a test circuit is provided which, with a failure of the front-axle brake circuit, triggers a signal cancelling the servo control operation at the rear-axle brake circuit and providing a connection thereof to one of the output pressure spaces of the braking pressure generator device and also generating an indicating signal characteristic thereof.

21. The brake system according to claim 20, wherein the closed-loop antiblocking control is also effected at the one brake circuit which, during normal braking action, is connected to its associated output pressure space of the braking-pressure generator, in accordance with a principle of changing the braking pressure by a pressure modulator arranged to be connected, via a solenoid valve, to one of the pressure output of the auxiliary pressure source and a pressureless storage reservoir of the auxiliary pressure source, the drive pressure space being charged with the output pressure source during normal braking action and, as a result, the piston being held in the position associated with a minimum volume of the output pressure space, and the output pressure space of the pressure modulator being connected to the associated output pressure of the braking-pressure generator during a normal braking action and being blocked off thereagainst in a closed-loop antiblocking control.

22. The brake system according to claim 21, wherein a force sensor integrated into the piston of the respective pressure modulator generates the output signal characteristic of the braking pressure in at least one of the two brake circuits.

23. The brake system according to claim 22, wherein a position transmitter for monitoring the position of one of the primary piston and the brake pedal of the brake device is a sensor for generating the output signal characteristic of the braking pressure in the front-axle brake circuit.

24. The brake system according to claim 23, wherein a position transmitter for detecting the position of the piston of the pressure modulator associated with the rear-axle brake circuit is a sensor for generating the output signal characteristic of the braking pressure in the rear-axle brake circuit.

25. The brake system according to claim 24, wherein a reference signal is formed as a function of vehicle-specific data comprising axle load distribution, rear axle load, wheelbase-related height of center of gravity, the loading situation and at least one characteristic of an operating situation including at least one of front axle and rear axle brake slip, vehicle speed, longitudinal vehicle deceleration and transverse vehicle acceleration.

26. The brake system according to claim 20, wherein a sensor for generating an output signal characteristic of braking pressure in the rear-axle brake circuit is a force transmitter, the test circuit generates during a braking action periodically repeated, short-time test control signals by way of which the output pressure space is connected for a short time, controlled via solenoid valves, to the secondary output pressure space of the braking pressure generator and is blocked off against wheel brakes of the rear-axle brake circuit and evaluates an output signal, resulting therefrom, of the force transmitter as an indication of a failure of the front-axle brake circuit.

27. The brake system according to claim 26, wherein a position transmitter for monitoring the position of one of the primary piston and the brake pedal of the braking pressure generator is a sensor for generating the output signal characteristic of the braking pressure in the front-axle brake circuit.

28. The brake system according to claim 23, wherein a comparison processor determines, from a measured value of vehicle deceleration $a_x$, a compatible position of the pressure rod piston of the braking-pressure generator and generates, from a comparison of this position with the position signalled by the output signal of the sensor, the failure-detection signal when these positions deviate from one another by more than a threshold value.

29. The brake system according to claim 27, wherein a comparison processor determines, from a measured value of vehicle deceleration $a_x$, a compatible position of the pressure rod piston of the braking-pressure generator and generates, from a comparison of this position with the position signalled by the output signal of the sensor, the failure-detection signal when these positions deviate from one another by more than a threshold value.

30. The brake system according to claim 2, wherein at least a sensor for generating a signal characteristic of the rear-axle brake circuit is a position transmitter monitoring a position of the piston of the braking-pressure actuator pressure modulator, the maximum displacement volume of the piston of the rear-axle pressure modulator is between 1.5 and 2.5 times greater than the brake fluid volume which can be displaced, with maximum output pressure of the auxiliary pressure source and perfect venting of the rear-axle brake circuit, in its wheel brakes, and a test circuit is provided which with switching-on of an ignition when the vehicle is still standing triggers a test cycle by way of which the output pressure of the auxiliary pressure source is coupled for a short time into the drive pressure space of the rear-axle pressure modulator and the resultant position output signal is obtained as a correction signal for taking into consideration the degree of venting of the rear-axle brake circuit.

31. The brake system according to claim 30, wherein a second output pressure space, which is connected to the front-axle brake circuit, is movable delimited by the piston of the rear-axle pressure modulator.

32. The brake system according to claim 31, wherein the second output pressure space is an annular space delimited in an axially housing-fixed manner by a radial housing step, via which a bore step with a smaller diameter, in which the step movable delimiting the output pressure space, of the modulator piston is carried displaceably in a pressure-tight manner, adjoins a medium-sized bore step with a slightly larger diameter, of the modulator housing, in which a medium-sized piston step of corresponding diameter is carried displaceably in a pressure-tight manner, which extends between the smaller piston step delimiting the output pressure space and the largest piston step, movably delimiting the drive pressure space, of the modulator piston.

33. The brake system according to claim 2, wherein a mechanically actuatable valve which passes into a block position after a short initial section of the braking-pressure build-up stroke of the modulator piston is operatively arranged to block off the braking-pressure actuator against the secondary output pressure of the braking-pressure generator.

34. A brake system comprising a hydraulic braking-force amplifier with a supply circuit which is supplied with pressure by utilizing an auxiliary pressure source provided for charging drive-pressure pressure modulators for closed-loop antiblocking control, the auxiliary pressure source comprising a chargeable pressure e accumulator, wherein between an output non-return valve of a charging pump, from an output side of which pressure supply line leading to the braking force amplifier runs, and a pressure accumulator, a priority valve is connected for only releasing a charging flow path when the pressure in the supply circuit of the braking-force amplifier has reached a minimum value required for a high degree of amplification.

35. The brake system according to claim 34, wherein the priority valve is a pressure-controlled 2/2-way valve which is driven with the output pressure of the pump.

* * * * *